March 21, 1961 R. B. VOGT 2,976,089
ROLLER WHEEL LUBRICATION
Filed June 24, 1958

INVENTOR.
Rudolph B. Vogt.
BY Wood, Herron & Evans.
ATTORNEYS.

United States Patent Office 2,976,089
Patented Mar. 21, 1961

2,976,089

ROLLER WHEEL LUBRICATION

Rudolph B. Vogt, Cincinnati, Ohio, assignor to The E. W. Buschman Company, Cincinnati, Ohio, a corporation of Ohio Filed June 24, 1958, Ser. No. 744,098

6 Claims. (Cl. 308—187)

This invention relates to roller wheels of the type adapted to be used in overhead or trolley conveyor systems wherein work pieces are respectively suspended upon a succession of brackets which are movably supported on a track by means of the roller wheels. The invention is directed particularly to the roller wheel bearing construction and to improvements facilitating greasing of the same.

In conventional constructions, roller wheels for overhead conveyors consist of a stub shaft having an inner ball race, a hollow cage which forms the outer ball race, and a plurality of bearing balls between the inner and the outer races. One end wall of the cage is completely closed while the opposite end wall has a clearance bore through which the stub shaft projects. The stub shaft is fastened to the trolley bracket to support the same, and, for lubrication, a protecting endwise portion of the stub shaft is equipped with a grease fitting which communicates with a bore extending axially through the stub shaft for admitting grease into the ball cage adjacent the closed end thereof. In use of such equipment, grease is applied periodically to the grease fittings of the wheels by means of a conventional grease gun. Since dust, dirt or water to which the roller wheel bearing is exposed in passing through a work cleaning chamber or the like may enter the bearing through the clearance opening between the stub shaft and the cage wall which surrounds it, it is conventional practice for the maintenance man to force grease into the wheel until grease visibly exudes through the clearance opening. The grease thereby closes or blocks off the clearance opening and seals the bearing against undesirable entry of foreign particles or water. Grease does not exude through the clearance opening until the entire space within the ball cage is completely filled with grease.

In conveyors of the type to which the present invention is directed several thousand support wheels may be employed in a complete conveyor system. Depending brackets are supported by pairs of such conveyor wheels and a flexible cable, driven from a power source, is connected to the brackets to pull the wheels and brackets along an overhead support. It will be appreciated that when the conveyor system utilizes two or three thousand bearings, all packed with the excessive amount of grease requisite to provide an adequate seal for the bearing, the bearing becomes relatively stiff instead of freely rotatable and the power requirement for driving the conveyor is far greater than it would be if the bearings of the roller wheels had grease sufficient only for the lubrication thereof. This is especially true when the apparatus is relatively cold. However, the sealing function of the grease cannot be disregarded in view of the fact that the conveyor must pass through work stations wherein the dirt, dust or other contaminating content of the atmosphere varies widely. For example, the conveyor might pass through one or more liquid baths or sprays, or past areas where grit or dust is in the air, all of which have the possibility of introducing foreign particles into the bearings.

Since thousands of roller wheels are required in a typical installation, the use of wheels having sealed bearings is prohibitively expensive.

The principal objective of this invention has been to provide an improvement in roller wheels for trolley conveyors in which adequate bearing lubrication and effective grease sealing of the bearing may be obtained without complete grease filling of the ball cage. Otherwise expressed, it has been an objective of the present invention to provide conveyor wheels which, upon greasing, will be effectively grease-sealed in the area of the clearance opening between the stub shaft and cage wall and effectively lubricated in the area of the anti-friction elements but which will otherwise be relatively free of grease so as to be freely rotatable at all times.

Another objective of the invention has been to provide a grease connection for the bearing of a wheel which includes a passage for admitting grease from a fitting partly into the bearing area and partly into a sealing compartment surrounding the stub shaft upon which the bearing and wheel is mounted.

A further objective of the invention has been to provide a support wheel for an overhead conveyor having a sealing washer mounted on the stub shaft of the wheel and engaging the surface of the wheel bearing outer race to form a small compartment fillable with grease to preclude introduction of foreign matter into the wheel bearings. The grease in the compartment also lubricates the area of contact of the washer riding on the surface of the outer race.

These and other objectives of the invention will become more readily apparent from the following detailed description taken into conjunction with the drawings in which.

Figure 1:
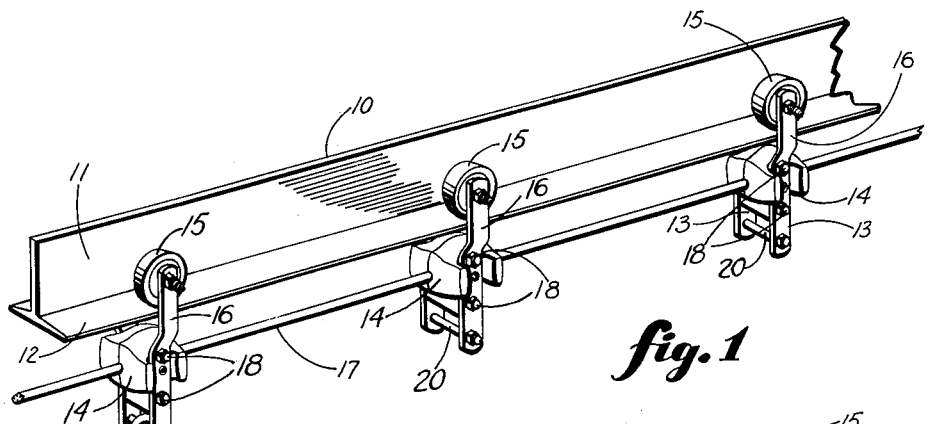
Fig. 1 is a perspective view of a fragment of a conveyor section which the present invention is used.

Fig. 1 illustrates typical conveyor equipment in which wheels constructed in accordance with the present invention are particularly useful. In a plant where work pieces are processed through various work stations, a continuous inverted T-beam 10 having a vertical web 11 and a horizontal member 12 passes through the various work stations. A plurality of elements upon which work pieces are supported are formed each by a pair of brackets 13 spaced by cable connecting blocks 14 and supported on the horizontal beam member 12 by wheels 15 rotatably mounted to the upper ends 16 of the brackets. A stranded cable 17 passes through the blocks 14 and is gripped by the blocks 14 by means of clamping bolts 18. The lower end of each bracket is provided with a transverse bolt 20 upon which an object indicated at 21 is supported. The object 21 may be either the article being processed or a support for articles being processed.

The structure illustrated above, generally, is known and forms no part of the invention. Rather, the invention is directed to the specific bearing and grease connection associated with each of the wheels 15.

Each wheel has a rim 22 which engages the horizontal member 12 of the support and which is fixedly secured to an outer race 23 of the bearing, such as by rolling over of the peripheral edge of the rim as at 24 or in other suitable manner.

The outer race 23 includes a cup shaped member 25 on the inner side of the wheel, that is the side normally adjacent the vertical web or cage end wall 11, and a wall member 26 which is clamped between the cup shaped member 25 and annular shoulder 27 on the rim 22, all of the elements cooperating to form the cage or cavity 29. The wall member 26 has a center hole 28 through which a stub shaft 30 passes. An inner bearing race 31 is integral with the stub shaft 30 and is spaced from the outer race 23 by anti-friction elements 32, which are, in this embodiment, ball bearings. Stub shaft 30 is threaded on its outer end at 33 to receive a nut 34 (Fig. 3) or other suitable fastening by which the wheel is mounted on the bracket upper end 16. In the arrangement shown, the bracket is held against a shoulder 35 formed on the stub shaft 30 by the nut.

The outer extremity of the stub shaft 30 has a grease gun fitting 36 fixed thereto. An axial bore 37 forms a passageway between the fitting 36 and the interior of the wheel. A radial bore 38 joins axial bore 37 with the bearing compartment of the wheel structure. The axis of the bore 38 lies approximately in the plane of the opening 28 so that grease introduced through the bore will be distributed in substantially equal amounts on either side of the wall member 26. The ratio of grease distribution to the two sides of member 26 need not necessarily be 1:1, but can be changed by shifting the axial position of the bore 38 with respect to the member 26.

A cavity 40 is formed adjacent to the opening 28 on the outside of the outer race by a cup shaped washer 41. The outer peripheral portion 43 of the washer 41 is in sliding engagement with the washer-like member 26. The central hole of the washer 41 surrounds the stub shaft 30 and is fixed thereto by staking at 42.

It is not necessary that the washer 41 be staked to the stub shaft. Rather it may be held in its proper relationship to the stub shaft and bearing race by the inner extremity 44 of the rim 22. However, the snug engagement of the washer 41 with the stub shaft 30 effected by staking provides a desirable seal in that it eliminates one opening for extraneous matter. With this construction the only possible entrance for foreign matter into the area of the bearings only is between the member 26 and the peripheral portion 43 bearing against the member 26. Passage of foreign matter in this direction is further impeded by the grease which fills cavity 40 when the bearing is lubricated.

Figure 2:
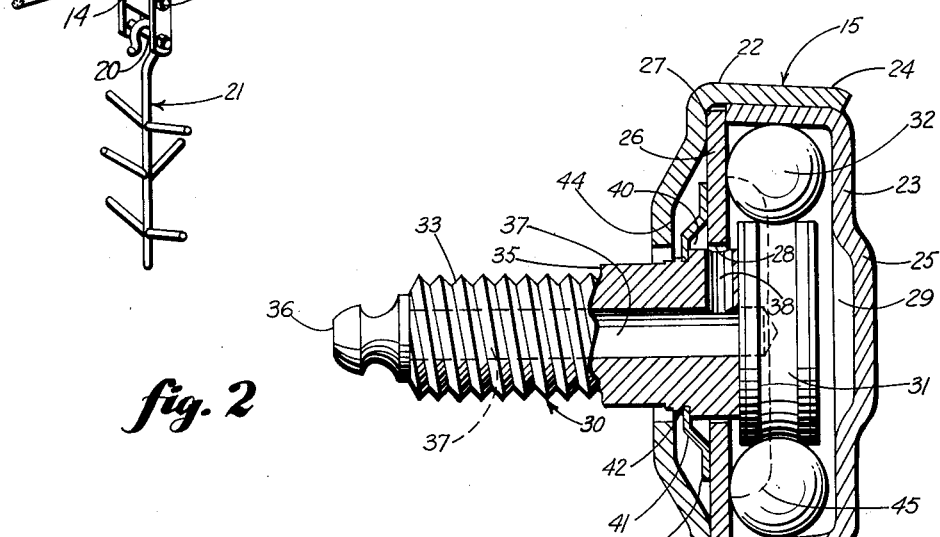
Fig. 2 is a cross-sectional view through the center of support wheel.

It can be seen by reference to Fig. 2 that a charge of grease introduced by way of the fitting 36 will substantially fill the cavity 40 and will fill the area of the bearings only to the extent indicated by the broken line 45. The ball bearings 32 will through their normal random motion distribute the grease uniformly among the balls and the outer race and inner race. Thus the bearings are not only effectively lubricated but are provided with a grease seal which is effective to prevent introduction of foreign matter, yet the cavity 29 is relatively free of grease packing which would otherwise impede free movement of the balls. In addition to forming the seal, the grease introduced into the cavity 40 lubricates the area of the engagement of peripheral portion 43 with the member 26 to prevent wear at this area.

Figures 3, 4:
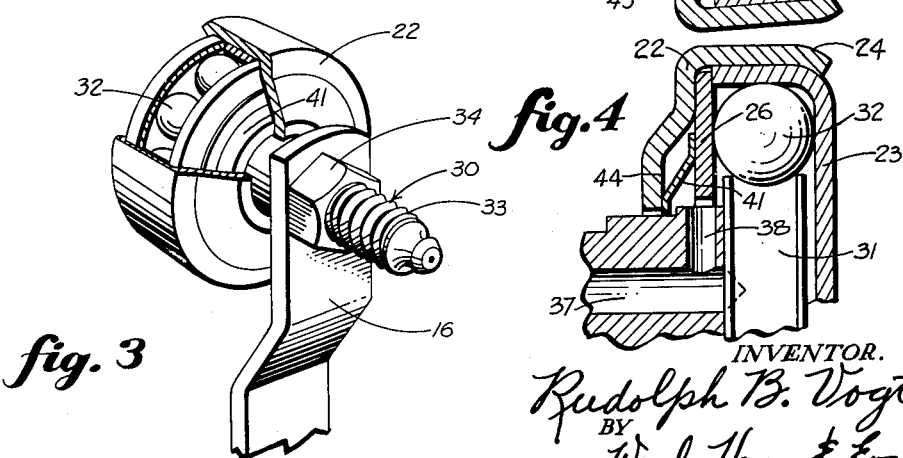
Fig. 3 is a perspective view, partly broken away of the invention.
Fig. 4 is a cross sectional view of an alternative embodiment.

The alternative embodiment of Fig. 4 differs from the embodiment of Figs. 1-3 principally in the manner in which washer 41 is positioned in the wheel. In this embodiment, the washer 41 has a tight spring fit between the inner extremity 44 of rim 22 and the member 26. The radially inner and outer marginal portions of the washer 41 bear against extremity 44 and member 26 respectively to cause all three parts to rotate together as a unit. Through this construction the frictional drag of the outer marginal portion of washer 41 on the member 26 as shown in Figs. 1 to 3 is eliminated, thereby providing a free running bearing.

The central hole of washer 41 has a rotating clearance with respect to the stub shaft 30. Should there be any drag at this point it will be at a minimum because the hub 1 is of relatively small diameter and grease will work into the clearance.

While the embodiment of the invention disclosed in the foregoing description, has been found to be practical and efficient, it will be understood that the invention is not limited to such embodiment as there might be changes made in the arrangement, disposition and form of the parts without departing from the principle of the present invention as comprehended within the scope of the accompanying claims.

What I claim is:

1. In a conveyor wheel having an inner race integral with a stub shaft at one end thereof and an outer race substantially surrounding said inner race and having a hole through which said stub shaft passes, said outer and inner races being spaced from each other by anti-friction elements, a grease connection comprising, a fitting on said stub shaft, said stub shaft having a passage from said fitting and opening adjacent the hole in said outer race whereby grease discharging from said passage will flow on the inside and outside of said outer race, and an outwardly bowed washer mounted by a central hole on said stub shaft and having its peripheral edge portion engaging said outer race, around a line spaced from the hole in said outer race, and forming a cavity with a portion of the outer surface of said outer race to receive grease.

2. In a conveyor wheel having an inner race integral with a stub shaft at one end thereof and an outer race substantially surrounding said inner race and having a hole through which said stub shaft passes, said outer and inner races being spaced from each other by anti-friction elements, a grease connection comprising, a fitting on said stub shaft, said stub shaft having a passage from said fitting and opening adjacent the hole in said outer race whereby grease discharging from said passage will flow on both sides of said outer race, and an outwardly bowed washer fixed by a central hole on said stub shaft and having its peripheral edge portion slidably engaging said outer race, around a line spaced from the hole in said outer race, and forming a cavity with a portion of the outer surface of said outer race to receive grease.

3. In a conveyor wheel having an inner race integral with a stub shaft at one end thereof and an outer race substantially surrounding said inner race and having a hole through which said stub shaft passes, said outer and inner races being spaced from each other by anti-friction elements, a grease connection comprising, a fitting on said stub shaft, said stub shaft having an axial bore from said fitting and terminating prior to the end of said stub shaft, said stub shaft having at least one radial bore opening adjacent said hole in said outer race whereby grease introduced at said fitting will pass through said bores and will discharge from said radial bore to flow on both sides of said outer race, and outwardly bowed washer mounted by a central hole on said stub shaft and having its peripheral edge portion engaging said outer race, around a line spaced from the hole in said outer race, and forming a cavity with a portion of the outer surface of said outer race to receive grease.

4. In a conveyor wheel having an inner race integral with a stub shaft at one end thereof and an outer race substantially surrounding said inner race and having a hole through which said stub shaft passes, said outer and inner races being spaced from each other by anti-friction elements, a grease connection comprising, a fitting on said stub shaft, said stub shaft having a passage from said fitting and opening adjacent the hole in said outer race whereby grease discharging from said passage will flow on both sides of said outer race, and means forming an outwardly bowed annular flange on said stub shaft adjacent the hole in said outer race, said flange having its peripheral edge portion engaging said outer race, around a line spaced from the hole in said outer race, and forming a cavity with a portion of the outer surface of said outer race to receive grease.

5. In a conveyor wheel having an inner race integral with a stub shaft at one end thereof and an outer race substantially surrounding said inner race and having a hole through which said stub shaft passes, and a rim portion extending radially inwardly from the periphery of said wheel and having a central hole spaced axially outwardly from the hole in said outer race, said outer and inner races being spaced from each other by anti-friction elements, a grease connection comprising, a fitting on said stub shaft, said stub shaft having a passage from said fitting and opening adjacent the hole in said outer race whereby grease discharging from said passage will flow on both sides of said outer race, and a washer disposed between said outer race and said rim portion and having a central hole surrounding said stub shaft, said washer having its peripheral edge portion bearing against said outer race, and its radially inner marginal portion bearing against said rim portion and forming a cavity with said outer race to receive grease.

6. A wheel according to claim 5 in which said washer is resiliently compressed between said outer race and said rim portion.

References Cited in the file of this patent
UNITED STATES PATENTS

| | | |
|---|---|---|
| 2,012,256 | Boudreau et al. | Aug. 27, 1935 |
| 2,034,948 | Knapp | Mar. 24, 1936 |
| 2,283,871 | Noreluis | May 19, 1946 |
| 2,717,808 | Owsen et al. | Sept. 13, 1955 |